United States Patent

Kato et al.

[11] 4,173,958
[45] Nov. 13, 1979

[54] CARBURETOR

[75] Inventors: Yuzo Kato; Akira Ii, both of Toyota; Tetsuya Oniki, Anjo, all of Japan

[73] Assignees: Toyota Jidosha Kogyo Kabushiki Kaisha; Aisan Kogyo Kabushiki Kaisha, both of Aichi, Japan

[21] Appl. No.: 832,560

[22] Filed: Sep. 12, 1977

[30] Foreign Application Priority Data

Apr. 22, 1977 [JP] Japan ................................ 52-46562

[51] Int. Cl.² .............................................. F02M 5/02
[52] U.S. Cl. ............................. 123/136; 123/139 AV; 261/36 A
[58] Field of Search ..................... 123/136, 139 AV; 137/38, 43; 180/104; 261/36 A, 70 R

[56] References Cited

U.S. PATENT DOCUMENTS

| 2,905,455 | 9/1959 | Eberhardt | 261/36 A |
| 3,196,926 | 7/1965 | Gartland | 123/139 AV X |
| 4,011,848 | 3/1977 | Coddington | 123/136 |
| 4,044,746 | 8/1977 | Kaye | 123/136 X |

Primary Examiner—Charles J. Myhre
Assistant Examiner—Tony M. Argenbright
Attorney, Agent, or Firm—Koda and Androlia

[57] ABSTRACT

A carburetor in a fuel system in a motor vehicle including a fuel tank, a fuel pump for delivering fuel from the fuel tank to the carburetor under pressure and the return line which returns fuel from the carburetor to the fuel tank when an excess amount of fuel is delivered to the carburetor by the fuel pump. The carburetor further includes a check valve means in the return line for preventing the flow of fuel in the return line in a direction from the fuel tank to the carburetor whereby leaking out of fuel from the carburetor of fuel flowing backwards through the return line is prevented when the vehicle is turned upside down in an accident.

5 Claims, 6 Drawing Figures

CARBURETOR

BACKGROUND OF THE INVENTION

1. Field of the Invention

This invention relates to an improved carburetor and more specifically to carburetors which prevent the flow of fuel backwards from the fuel tank to the carburetor through a return fuel line.

2. Prior Art

In general in today's motor vehicles provided with emission controlled devices and the like a portion of the fuel which is delivered under pressure from the fuel tank to the carburetor by means of a fuel pump is vaporized and sent to the engine while the remainder of the fuel is returned to the fuel tank via a fuel return line.

When a motor vehicle equipped with such a carburetor is involved in an accident in which the motor vehicle is turned over and laid on its side, etc., the fuel tank may end up in a position which is higher than the position of the carburetor. In such a case, the fuel inside the fuel tank will flow backwards through the fuel return line until it reaches the carburetor and then spill out of the carburetor. If a spark is created by a short in the electrical system, etc., there is a great danger that the spilled fuel will ignite thereby causing a motor vehicle fire and possibly an explosion.

SUMMARY OF THE INVENTION

Accordingly, it is the general object of the present invention to provide a carburetor which prevents the flow of fuel from the fuel tank backwards through the fuel return line and spilling out of the carburetor.

It is another purpose of the present invention to provide a carburetor which prevents the flow of fuel from the fuel tank backwards through the fuel return line and spilling out of the carburetor which is quickly and simply installed.

It is still another object of the present invention to provide a carburetor which presents the flow of fuel from the fuel tank backwards through the fuel return line and spilling out of the carburetor which is simple and inexpensive to manufacture.

In keeping with the principles of the present invention, the objects are accomplished by a unique carburetor in a fuel system in a motor vehicle of the type including a fuel tank, a fuel pump for delivering fuel from the fuel tank to the carburetor under pressure and a return fuel line which returns fuel from the carburetor to the fuel tank when an excessive amount of fuel is delivered to the carburetor by the fuel pump. The carburetor further includes a check valve means in the return line for preventing the flow of fuel in the return line in a direction from the fuel tank to the carburetor whereby leaking out of fuel from the carburetor flowing backwards through the return line is prevented when the vehicle is turned over and laid on its side, etc., in an accident.

BRIEF DESCRIPTION OF THE DRAWINGS

The above-mentioned features and objects of the present invention will become more apparent by reference to the following description taken in conjunction with the accompanying figures, wherein like reference numerals denote like elements and in which.

DETAILED DESCRIPTION OF THE INVENTION

Figure 1:
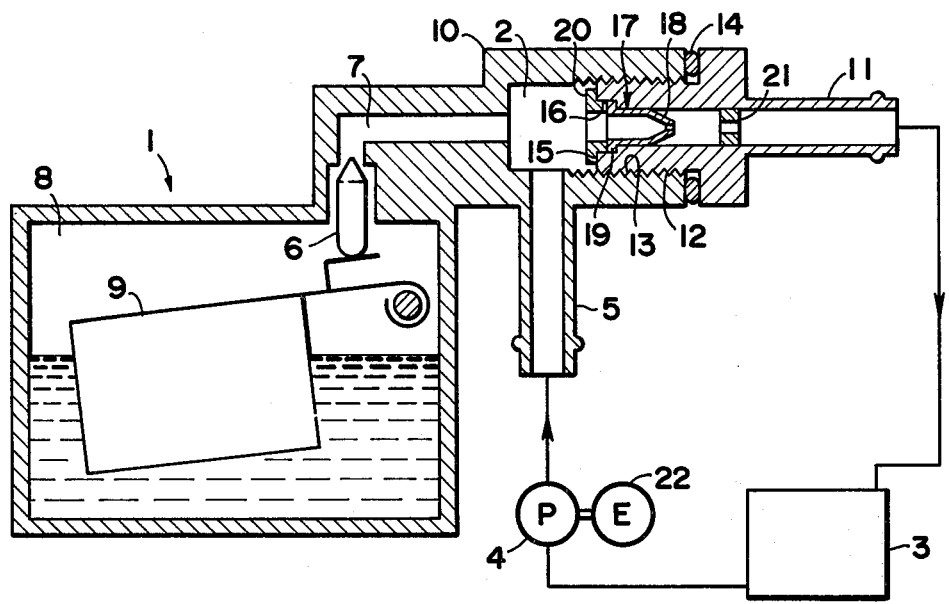
FIG. 1 is a cross-sectional view including a partial schematic diagram which illustrates an embodiment of a carburetor in accordance with the teachings of the present invention.

Referring more particularly to the figures, shown in FIG. 1 is a fuel system wherein fuel is delivered under pressure from a fuel tank 3 to the fuel inlet 2 of a carburetor 1 via fuel inlet tube 5 by fuel pump 4. The fuel inlet 2 is coupled to float chamber 8 by a passage 7 which is opened and closed by a needle valve 6. The float 9 actuates the needle valve 6.

The fuel inlet 2 is connected to the fuel tank 3 via fuel outlet tube 11 which is fastened to the carburetor body assembly 10 by being threaded into the assembly 10. By means of fuel outlet tube 11, the fuel delivered under pressure by the fuel pump 4 which remains after the float chamber 8 has been supplied with sufficient fuel is returned to the fuel tank 3. The fuel outlet tube 11 is screwed into the carburetor body assembly 10 by male threads 12 formed around the circumference of the tube 11 and female threads 13 formed in the fuel inlet 2 of the carburetor body assembly 10. An O-ring 14 forms a seal between the carburetor body 10 and the fuel outlet 11.

The end surface 15 of fuel outlet tube 11 is positioned so that it faces the fuel inlet 2. An increased diameter step section 16 whose diameter is greater than the inside diameter of the fuel outlet tube 11 is formed in the end surface 15. Furthermore, a check valve 17 is inserted in the fuel outlet tube 11 from the end of the tube 11 on which the end surface 15 is located. The check valve 17 is made of an elastic material such as rubber, soft plastic, etc. and is of cylindrical shape. The inserted tip 18 is compressed into the shape of a duckbill and an increased diameter flange 19 is formed around the base of check valve 17. The outside diameter of the check valve 17 is approximately equal to the inside diameter of the fuel outlet tube 11 and the other all diameter of the flange 19 is approximately equal to that of the increased diameter step section 16. A stopper 20 is forced fitted into the increased diameter step section 16 to prevent the base of the check valve 17 from slipping out of the tube 11. The stopper 20 is also a cylindrical part with a flange formed about its base. A return jet 21 which regulates the amount of fuel returned to the fuel tank is also provided in the outlet tube 11.

In operation, when the motor vehicle is operating normally, fuel from the fuel tank 3 is delivered to the fuel inlet tube in the carburetor body assembly 10 via the fuel inlet tube 5 by the fuel pump 4 which is driven by the engine 22. The fuel then flows through the passage 7 and into the float chamber 8 from where it is sent to the engine 22 after being vaporized by the main nozzle (not shown in figures), etc. When the float chamber 8 becomes full, the needle valve 6 closes the passage 7. The remainder of the fuel supplied by the fuel pump 4 then flows into the fuel outlet tube 11. This fuel pushes open the duckbill portion 18 of the check valve 17 and is returned to the fuel tank 3 after passing through the return jet 21. If the fuel tank 3 is placed in a position higher than the carburetor 1 due to the automobile being involved in an accident in which it is for example turned upside down, the fuel inside the fuel tank 3 will tend to flow backwards through the fuel outlet tube 11 and into the fuel inlet 2. When this occurs, the duckbill-shaped tip 18 of the check valve 17 is deformed by the pressure created by the backward flow of the fuel and is thereby closed. Thus, the fuel inside the fuel tank 3 is prevented from reaching the fuel inlet 2. This prevents fuel from spilling out of the carburetor 1 and igniting and causing a fire.

Figure 2:
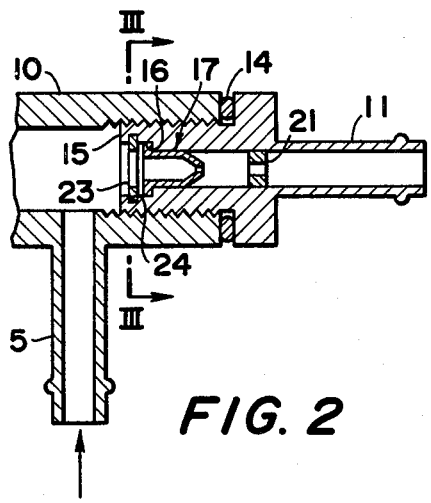
FIG. 2 is a cross-sectional view illustrating the essential parts of a second embodiment in accordance with the teachings of the present invention.
Figure 3:
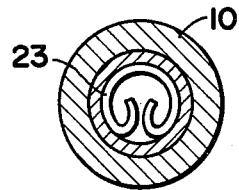
FIG. 3 is a cross-sectional view along the line III—III in FIG. 2.

Referring FIG. 2, shown therein as a second embodiment in accordance with the teachings of the present invention. This second embodiment is substantially the same as shown in FIG. 1 except that another means instead of the stopper means 20 is provided for holding the check valve 17 in the outlet tube 11. In FIGS. 2 and 3, the check valve is prevented from slipping out of the fuel outlet tube 11 by inserting a snap ring 23 into a snap ring groove 24 which is provided inside the end of the fuel outlet tube 11. In this manner, the check valve 17 is prevented from slipping out of the outlet tube 11.

Figure 4:
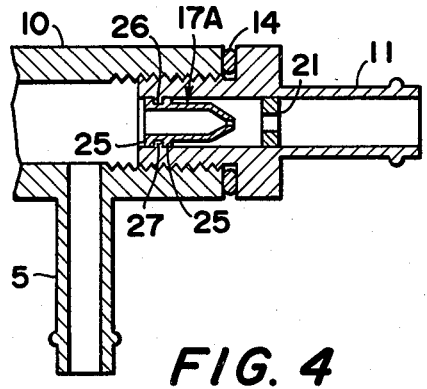
FIG. 4 is a cross-sectional view illustrating the essential parts of a third embodiment in accordance with the teachings of the present invention.

Referring to FIG. 4, shown therein as a cross-section illustrating a third embodiment in accordance with the teachings of the present invention. Similar to that shown in FIGS. 2 and 3, this third embodiment is substantially the same as shown in FIG. 1 except that another means instead of the stopper means 20 is provided for fastening the check valve 17 in place. In this embodiment, the check valve 17A is provided with a pair of ring-like projections 25 which are provided near the base of the check valve 17A and in which run around the circumference of the check valve 17A in planes parallel to the axis of check valve 17A. A single circumferential groove 26 is formed between the ring-like projections 25. Furthermore, another ring-like projection 27 is formed on the inside surface of the fuel outlet tube 11. The check valve 17A is fastened to the fuel outlet tube 11 by fitting the circling groove 26 over the ring-like projection 27.

When comparing the embodiments shown in FIGS. 1 and 2 with the embodiments shown in FIG. 4, the embodiment of FIG. 4 is as advantageous in that the check valve can be installed quickly and the overall number of parts required is reduced.

Figure 5:
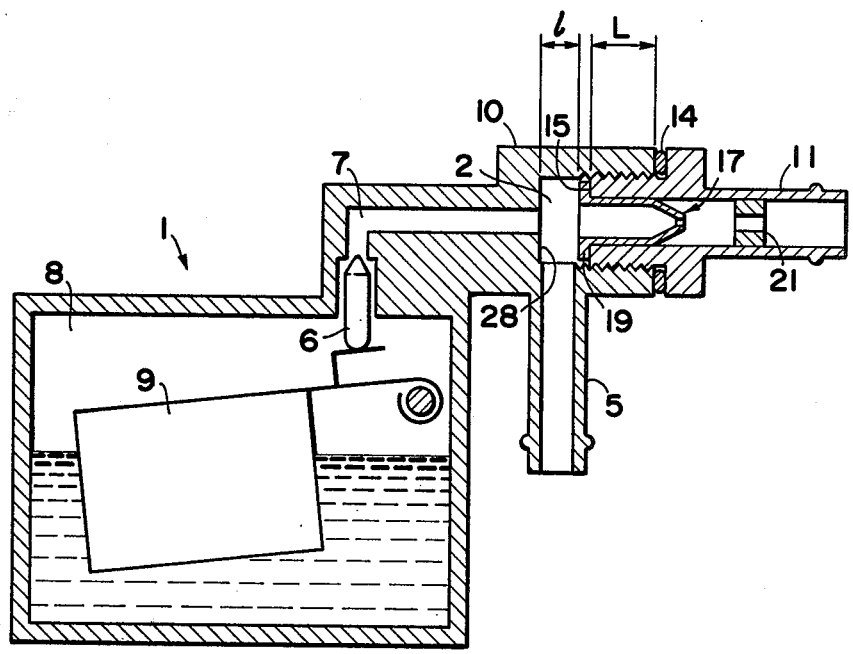
FIG. 5 is a cross-sectional view illustrating a fourth embodiment in accordance with the teachings of the present invention.

Referring to FIG. 5, shown therein is a fourth embodiment in accordance with the teachings of the present invention. Similar to the embodiments previously described, the embodiment of FIG. 5 is substantially the same as that of FIG. 1 except that another means is provided for preventing the check valve 17 from slipping out of the outlet tube 11.

In FIG. 5, the end surface 15 of the fuel outlet tube 11 is positioned such that it is near the opposite wall surface 28 of fuel inlet 2. The check valve 17, which is forced fitted into the fuel outlet tube 11 from one end, is identical to that of FIG. 1. The distance 1 between the end surface of the flange 19 of check valve 17 and the wall surface 28 of the fuel inlet tube is shorter than the length L of the portion of the check valve 17 which is inserted into the fuel inlet tube 11.

Figure 6:
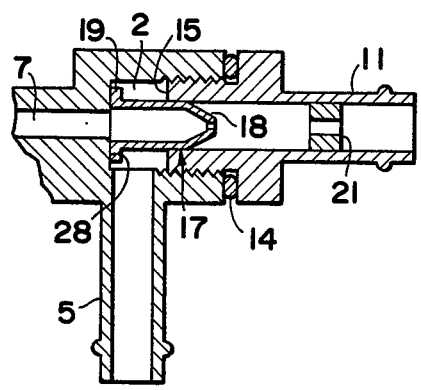
FIG. 6 is an abbreviated cross-sectional view illustrating the operation of the fourth embodiment of FIG. 5.

In operation, the duckbill-shaped tip portion 18 of check valve 17 is closed when fuel flows backwards through the fuel outlet tube 11 such that this reversed flow of fuel is stopped. At this time, however, pressure of the fuel acts on the check valve 7 and attempts to push the check valve 17 out of the fuel outlet tube 11. If the force fit of the check valve 17 is weak enough, the check valve 17 is pushed out of the tube 11 and into the fuel inlet 2. However, since the distance between the flange 19 of the check valve 17 and the opposite wall surface 28 of the fuel inlet 2 is shorter than the length of the portion of the check valve 17 inserted into the fuel outlet tube 11, the check valve 17 will only move partially out of the fuel outlet tube 11 as shown in FIG. 6. In this position, the tip portion of the check valve 17 is still inserted in the fuel outlet tube 11 and the check valve 11 is prevented from slipping out of the tube 11.

When comparing the embodiment shown in FIGS. 1 through 4 with that of FIG. 5, the embodiment of FIG. 5 is advantageous over the other embodiments since it can be assembled without any need for machining the inside of the fuel outlet tube 11, inserting a stopper 20, or complicating the shape of the check valve 17 itself.

In all cases, it is understood that the above described embodiments are merely illustrative of but a few of the many possible specific embodiments which represent the applications of the principles of the present invention. Numerous and varied other arrangements can be readily devised in by those skilled in the art without departing from the scope of this invention.

What is claimed is:

1. A carburetor in a fuel system in a motor vehicle of the type including a fuel tank, a fuel pump for delivering fuel under pressure to said carburetor and a return fuel line which returns fuel from said carburetor to said fuel tank when an excess amount of fuel is delivered to said carburetor by said fuel pump, said carburetor comprising:
   a float chamber;
   a fuel inlet communicating with said float chamber and coupled to said fuel pump;
   a fuel outlet tube provided in said carburetor and communicating with said fuel inlet, said fuel outlet tube being coupled to said return fuel line; and
   a check valve means provided in said fuel outlet tube for preventing fuel from said fuel tank from flowing to said carburetor, said check valve means comprising a cylindrically shaped check valve made from an elastic material and having a tip in the shape of a duckbill.

2. A carburetor according to claim 1 wherein said check valve is prevented from coming out of said fuel outlet tube by a snap-ring inserted into a circumferential groove provided in said fuel outlet tube.

3. A carburetor according to claim 1 wherein an inside surface of said fuel outlet tube is provided with a circumferential projection and said elastic check valve is provided with at least two ring-like projections which engage with said circumferential projection provided on an inside surface of said fuel outlet tube.

4. A carburetor according to claim 3 wherein said fuel outlet tube is further provided with a return jet.

5. A carburetor according to claim 1 wherein an end of said outlet tube is located near an opposite wall surface of said fuel inlet, and said check valve is inserted into said outlet tube from said end of the tube in a position such that a distance between an end surface of said check valve and said wall surface is shorter than a length of a portion of said check valve which is inserted into said fuel inlet tube.

* * * * *